United States Patent
Manghnani et al.

(10) Patent No.: US 11,971,805 B2
(45) Date of Patent: Apr. 30, 2024

(54) INTELLIGENT AUTOMATED FEATURE TOGGLE SYSTEM USING ANNOTATIONS

(71) Applicant: INTERNATIONAL BUSINESS MACHINES CORPORATION, Armonk, NY (US)

(72) Inventors: Geet Manghnani, Bangalore (IN); Josephine E. Justin, Bangalore (IN); Ajay Chebbi, Bangalore (IN); Srikanth K. Murali, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 17/497,111

(22) Filed: Oct. 8, 2021

(65) Prior Publication Data

US 2023/0109694 A1    Apr. 13, 2023

(51) Int. Cl.
  *G06F 11/36* (2006.01)
  *G06F 8/30* (2018.01)
  (Continued)

(52) U.S. Cl.
  CPC ............ *G06F 11/3612* (2013.01); *G06F 8/30* (2013.01); *G06F 8/73* (2013.01); *G06F 8/75* (2013.01); *G06F 11/3624* (2013.01)

(58) Field of Classification Search
  CPC ..... G06F 8/30; G06F 8/73; G06F 8/75; G06F 11/3612; G06F 11/3624
  (Continued)

(56) References Cited

U.S. PATENT DOCUMENTS 6,876,314 B1    4/2005    Lin
9,417,857 B2    8/2016    Chafi
(Continued)

FOREIGN PATENT DOCUMENTS

CN    109799990    3/2019

OTHER PUBLICATIONS

Matus Sulir et al., Exposing Runtime Information through Source Code Annotations, Acta Electrotechnica et Informatica, vol. 17, No. 1, 2017, 3-9, DOI: 10.15546/aeei-2017-0001, 7 pages.
(Continued)

*Primary Examiner* — Wei Y Zhen
*Assistant Examiner* — Mohammed N Huda
(74) *Attorney, Agent, or Firm* — Schmeiser, Olsen & Watts, LLP; Edward Wixted

(57) ABSTRACT

A method includes receiving, by one or more processors of a computer system, source code, annotating, by the one or more processors of the computer system, features of the received source code using an automated annotation system to provide annotations for the features, relating, by the one or more processors of a computer system, a code execution path of the source code to the features during the annotating, identifying, by the one or more processors of the computer system, a runtime issue associated with the source code, identifying, by the one or more processors of the computer system using a code analytic engine, one or more of the features based on the annotations that are associated with the runtime issue, and automatically disabling, by the one or more processors of the computer system, the identified one or more features associated with the runtime issue.

17 Claims, 8 Drawing Sheets

(51) Int. Cl.
*G06F 8/73* (2018.01)
*G06F 8/75* (2018.01)

(58) Field of Classification Search
USPC .......................................................... 717/130
See application file for complete search history.

(56) References Cited

U.S. PATENT DOCUMENTS

| | | |
|---|---|---|
| 10,223,236 B2 | 3/2019 | Carey |
| 10,379,848 B2 | 8/2019 | Chee |
| 2018/0024911 A1* | 1/2018 | Kruszewski et al. ........................ G06F 11/3624 717/125 |
| 2020/0125732 A1* | 4/2020 | Iyer et al. ........... G06F 11/3612 |
| 2021/0349808 A1* | 11/2021 | Chen et al. ................ G06F 8/75 |
| 2022/0222165 A1* | 7/2022 | Garg et al. ................ G06F 8/75 |

OTHER PUBLICATIONS

Mell, Peter et al.; "The NIST Definition of Cloud Computing;" National Institute of Standards and Technology; Special Publication 800-145; Sep. 2011; 7 pages.

* cited by examiner

INTELLIGENT AUTOMATED FEATURE TOGGLE SYSTEM USING ANNOTATIONS

BACKGROUND

The present invention relates to identifying runtime application failures for software development. More specifically, the invention relates to identifying features which may be causing runtime application failures so that an application can run without failures. To face competitive market challenges, enterprises have a pressure to release features to market very quickly. In a microservices environment, this can have unintended side effects that create operational instability, and often the offending feature must be rolled back. Sometimes enterprises are unaware of issues faced by an end-user. When a new feature is released, there is always a possibility that a customer may face an issue in production with the newly launched feature.

SUMMARY

An embodiment of the present invention relates to a method, and associated computer system and computer program product, for automating feature toggle with annotations. One or more processors of a computer system receiving source code. The one or more computer processors of the computer system annotate features of the received source code using an automated annotation system to provide annotations for the features and relate a code execution path of the source code to the features during the annotating. The one or more computer processors of the computer system identify a runtime issue associated with the source code. A code analytic engine of the one or more processors of the computer system identifies one or more of the features based on the annotations that are associated with the runtime issue. The one or more processors of the computer system automatically disable the identified one or more features associated with the runtime issue.

DETAILED DESCRIPTION

The present invention relates to a method by which a feature that is causing a runtime error in source code is identified and disabled via an automated and automatic system. The system may further be configured to identify issues in a bug tracking system for the purposes of tracking, so that re-enabling of a feature can occur automatically once a proper fix has been made.

The present invention provides systems and methods that relate the code execution path of source code to a feature of the source code and to runtime issues. This relating is accomplished by annotations for the features which can be automatically created by an automated annotation system. Defined annotations may alternatively be entered by a developer manually during the development of the source code. At runtime, when an issue such as an unexpected error or exception happens repeatedly, the impacted feature is identified via the annotation. Once the feature is identified, the feature is automatically disabled to avoid further impact on the end customer.

Figure 1:
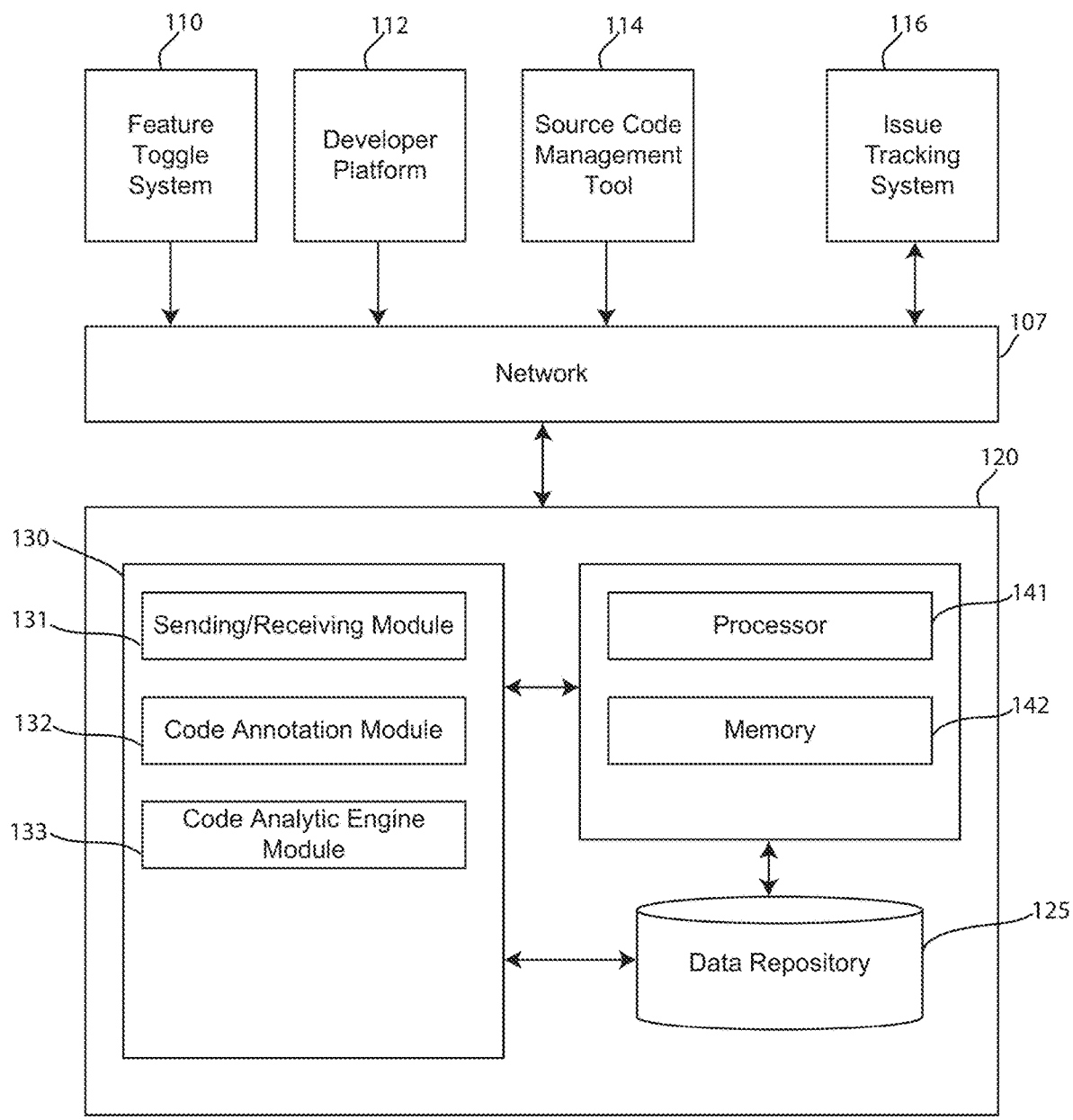
FIG. 1 depicts a block diagram of a system for automated feature toggle with annotations, in accordance with embodiments of the present invention.

FIG. 1 depicts a block diagram of a system for automated feature toggle with annotations 100, in accordance with embodiments of the present invention. Embodiments of the system for automated feature toggle with annotations 100 may include both a code analytic engine (CAE) and a Code Annotation Engine (CAA), and may be configured to perform the methodology relating to identifying a feature that is causing a runtime error in source code and disabling the feature via an automated and automatic system as described herein.

The system for automated feature toggle with annotations 100 may include a developer platform 112. The developer platform 112 may be in communication with various other software development tools such as a feature toggle system 110, a source code management tool 114 and an issue tracking system 116. As shown, the developer platform 112, the feature toggle system 110, the source code management tool 114 and the issue tracking system 116, in addition to being connected with each other, may be in communication with a computer system 120 over a network 107. The computer system 120 may include the various functionality described herein for interacting with a software developer in a manner which identifies features which may be causing runtime application failures so that an application can run without failures, via the methodology described herein.

The software developer platform 112 may be any software development platform allowing a software developer to write source code for a software development project. The software developer platform 112 may utilize a continuous integration/continuous delivery (CI/CD) pipeline to allow the developed source code to be delivered or deployed in a side car pattern with a code analytic engine of the computer system 120 described herein below. The software development platform 112 may include one or more developer workstations, connectable over a network, for developing source code for a software development project.

The feature toggle system 110 may be a feature toggle system running in the cloud connectable to both the software developer platform 112 and the computer system 120. The feature toggle system 110 may be configured to manually or automatically disable or enable a feature identified in a source code. The feature toggle system 110 may be a system such as IBM Cloud App Configuration™, LaunchDarkly™, Istio™ for Kubernetes, or the like, and maybe configured to disable features when a threshold for an exception or error is reached.

The source code management tool 114 may be a task and/or story and/or epic software development tool such as Github™, Gitlab™, or Microsoft Team Foundation Server™ (TFS). The source code management tool 114 may be an integral system within the software development platform 112 of a enterprise or user that is developing source code or software. The source code management tool 114 may provide functionality to allow teams of developers to develop code, sync the code, and or run the code and/or deploy the code in an application.

The issue tracking system 116 may be a feature of the code analytic engine of the computer system 120 or may be a separate feature that is connectable to the computer system 120 as shown. The issue tracking system 116 may be configured to create an issue so that the exception or error can be tracked for a bug fix to re-enable the feature toggle in the feature toggle system 110.

While the developer platform 112, the feature toggle system 110, the source code management tool 114 and the issue tracking system 116, are shown as separate features to the computer system 120, it should be understood that one or more of those systems 110, 112, 114, 116, or the functionality thereof, may be incorporated into the computer system 120. Thus, while the computer system 120 includes its own software modules and functionality, the computer system 120 may include modules which accomplish the functionality of the systems 110, 112, 114, 116. In other words, while in some cases, the computer system 120 includes The network 107 may be any group of two or more computer systems linked together. The network 107 may represent, for example, the internet. The network 107 may be any type of computer network known by individuals skilled in the art. Examples of computer networks which may be embodied by the network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture.

The computer system 120 is shown connected to the developer platform 112, the feature toggle system 110, the source code management tool 114 and the issue tracking system 116 via the network 107. While the computer system 120 is shown as a separate component of the system for automated feature toggle with annotations 100 than the developer platform 112, the feature toggle system 110, the source code management tool 114 and the issue tracking system 116, in other embodiments, the computer system 120 may be located on-site at the physical location of a developer or deployed as a local solution by the developer, inclusive in, for example, the developer platform 112.

Embodiments of the computer system 120 may include a module structure 130 that includes a sending and receiving module 131, an code annotation module 132, and a code analytic engine module 133. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines. The modules may each be separate components of the computer system 120. In other embodiments, more than one module may be a single combined computer program, or hardware module.

Embodiments of the sending and receiving module 131 may include one or more components of hardware and/or software program code for obtaining, retrieving, collecting, or otherwise receiving information from the developer platform 112, the feature toggle system 110, the source code management tool 114 and the issue tracking system 116, or transmitting information or processing results from the module structure 130. In an exemplary embodiment, the sending and receiving module 131 may be configured to receive source code from the developer platform 112 for processing by the module structure 130. In another example, the sending and receiving module 131 may be configured to transmit and/or receive information directly from the feature toggle system 110, the source code management tool 114 and/or the issue tracking system. The sending and receiving module 131 may provide information received by the computer system 120 from the developer platform 112, the feature toggle system 110, the source code management tool 114 and the issue tracking system 116, to be stored in the data repository 125 or may provide information received directly to the module structure 130.

Referring still to FIG. 1, embodiments of the computer system 120 may further include the code annotation module 132. Embodiments of the code analytics module 132 may include one or more components of hardware and/or software program code for generating source code annotations with feature details based on runtime information associated with the execution of an ahead of time compiled machine code. The code annotation module 132 may be configured to track received source code and check-in and/or pull requests during code merges that are associated with a task, story and/or epic in a DevOps lifecycle. The code analytics module 132 may be configured to add annotations with feature details into the code when the code is merged, and may further be configured to identify the feature name from a task associated with the code merge for using the feature to annotate the code. Alternatively or additionally, the code analytics module 132 may be configured to allow a developer to manually add annotations.

Embodiments of the code analytic engine module 133 may include one or more components of hardware and/or software program code for monitoring issues including exceptions or errors that happen at runtime in a deployed application. The code analytic engine module 133 may be configured to deploy itself as a sidecar pattern along with the application code. The code analytic engine module 133 may be operable during a continuous integration/continuous delivery (CI/CD) pipeline which may deploy the sidecar pattern of the code analytic module 133 and the application. The code analytic engine module 133 may be defined with a threshold for issues (i.e. exceptions and/or errors) which defines the policy that is configured for the code analytics engine module 133 to take action based on an error rate and/or severity of error. The code analytic engine module 133 may be configured to determine the exception and/or error and note the feature associated therewith using the annotation in the part of the source code based on the threshold value when an exception or error occurs. Further, the code analytic engine module 133 is configured to send a request to the feature toggle system 110 to disable the feature when the threshold for the exception and/or error has been reached. The code analytic engine module 133 may be integrated with an issue tracking system, or may be configured to communicate with the external issue tracking system 116, in order to create an issue notification that may be provided to the developer platform 112 so that the exception and/or error may be tracked or a bug fix to re-enable that feature toggle once the fixing occurs by the feature toggle system 110.

Referring still to FIG. 1, embodiments of the computer system 120 may be equipped with a memory device 142 which may store the information related to the data center 110 and/or the battery system 111 thereof. The computer system 120 may further be equipped with a processor 141 for implementing the tasks associated with the system for automated feature toggle with annotations 100.

Figure 2:
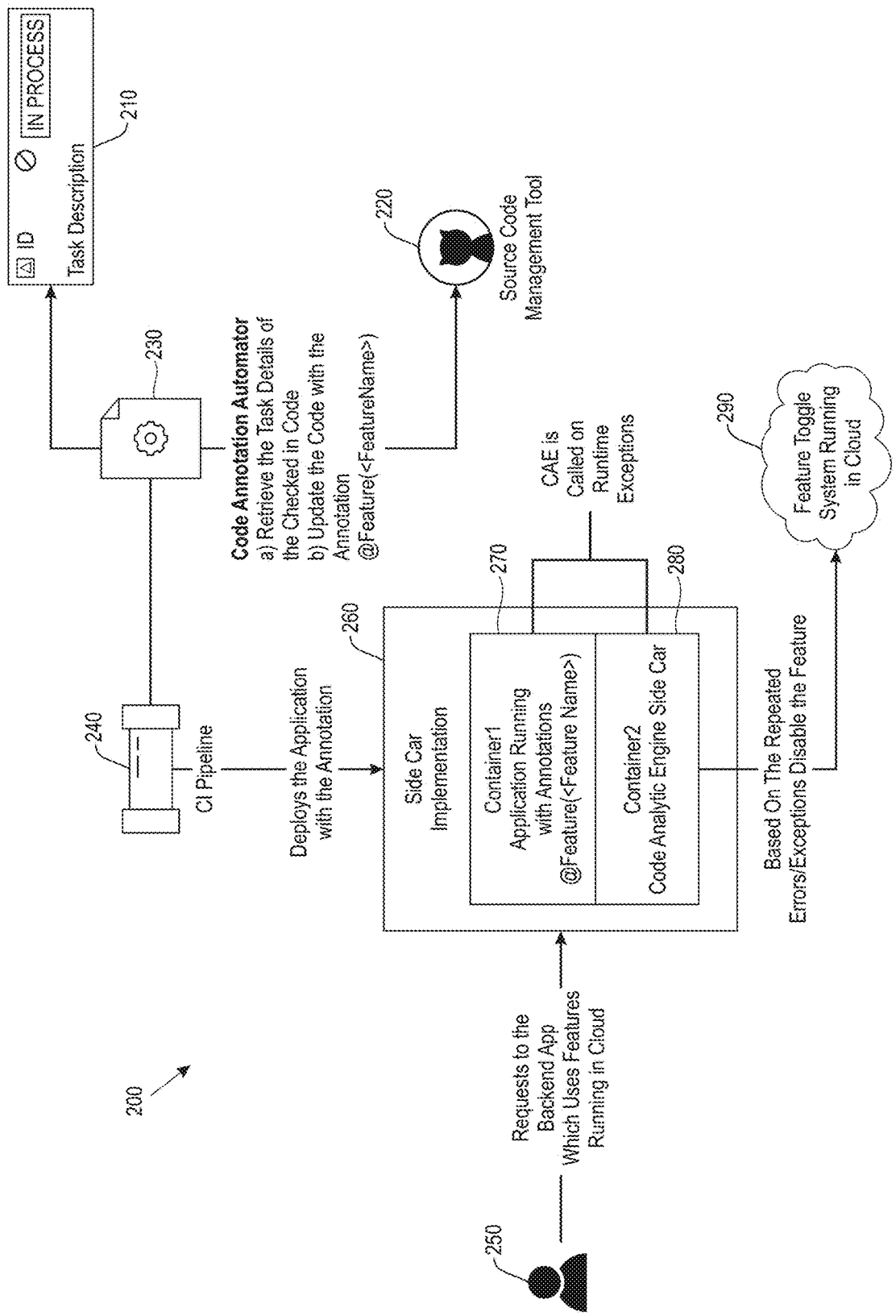
FIG. 2 depicts an architectural level of a code analytic engine of the system of FIG. 1, in accordance with embodiments of the present invention.

FIG. 2 depicts an architectural level of a code analytic engine 200 of the system 100 of FIG. 1, in accordance with embodiments of the present invention. As shown a code annotation automator 230 may be in communication with a source code management tool 220 and a task process 210. The code annotation automator 230 may be configured to retrieve task details related to source code received from the source code management lifecycle tool 220. The code annotation automator 230 may be configured update the code with annotations related to the features in the code, in the manner described hereinabove. The code annotation automator 230 may be in communication with a CI/CD pipeline 240 which deploys the application with the annotations provided by the code annotation automator 230. As shown in FIG. 2, the code analytic engine architecture 200 may deploy a side car implementation 260 that includes a sidecar container of a code analytics engine 280 in a sidecar arrangement with a container 270 of the application running with annotations. The code analytic engine sidecar deployment 280 may be configured to monitor the application for runtime exceptions, issues or other bugs. Based on the runtime exceptions, if a threshold is achieved for an exception, the code analytic engine sidecar deployment 280 may be configured to identify the part of the source code that is failing from the exception details. With the identified source code which is causing the exception, the code analytic engine sidecar deployment 280 may be configured to retrieve the feature details from the annotation of the corresponding source code. With the feature details, the code analytic engine sidecar deployment 280 may interact with a feature toggle system 290 which may be cloud based, for example, and which may toggle off the feature identified by the code analytic engine sidecar deployment 280. This may ensure that the code responsible for an issue, exception and/or error is bypassed to avoid more user facing errors faced by a user 250. Additionally, the code analytic engine sidecar deployment 280 may be configured to create issue notifications for the user 250 with the details gathered. The toggle feature of the code analytic engine sidecar deployment 280 may be integrated with various APIs of services such as IBM Cloud App Configuration™. Next, disabling the feature means that the part of the code causing the issue will not be executed at runtime until the issue is fixed by the developer 250. This may be done by the code analytic engine sidecar deployment 280 without any deployment, as feature toggles can be handled at runtime using services such as IBM Cloud App Configuration™. When the issue is finally fixed by the developer 250, the code is re-deployed and the feature is toggled on by the develop 250 or product owner again for the customers to use the new application feature.

Figure 3:
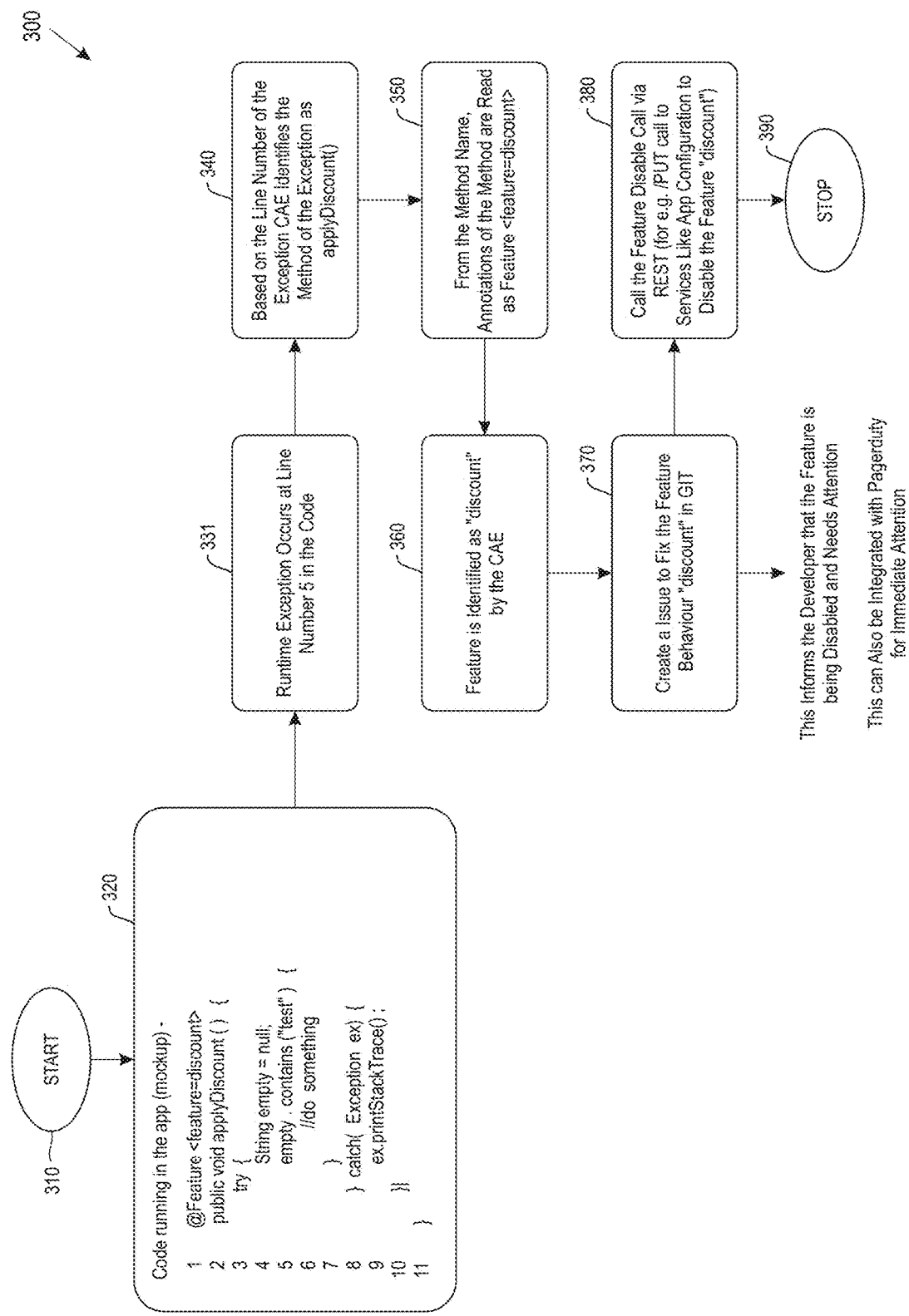
FIG. 3 depicts a flow chart of a method of automated feature toggle with annotations using the system for automated feature toggle with annotations of FIG. 1, in accordance with embodiments of the present invention.

FIG. 3 depicts a flow chart of a method 300 of automated feature toggle with annotations using the system for automated feature toggle with annotations of FIG. 1, in accordance with embodiments of the present invention. As shown, a start step 310 includes an exemplary code 320 running in an app. At a step 330 an exception occurs at a number 5 line of the exemplary code. At a step 340, based on the line number of the exception, the code analytics engine 280 identifies the method of the exception as applyDiscount( ) From the method name, annotations of the method are read as Feature <feature=discount>, at a step 350. From here, the feature is identified as "discount" by the code analytics engine 280. The code analytics engine 280 then creates an issue to fix the feature behavior "discount" in the source code management tool 114. The source code management tool 114 may inform the developer 250 that the feature is being disabled and needs attention. At a next step 380, the feature may be disabled via REST. From here, the method 300 is shown to end at a step 390, but may further include reenabling the feature once the issue is resolved by the developer 250.

Figure 4:
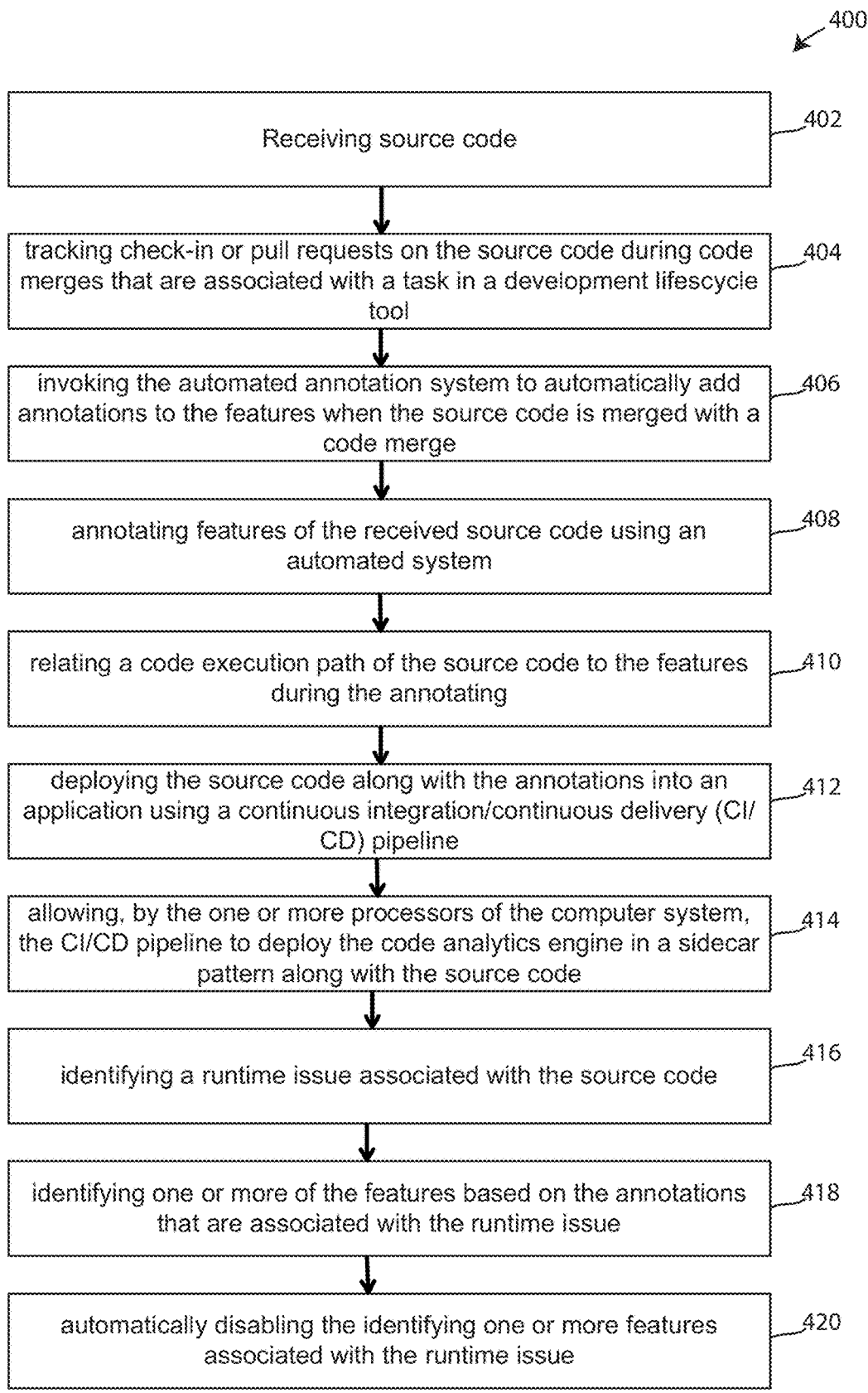
FIG. 4 depicts a flow chart of a method for automated feature toggle with annotations, in accordance with embodiments of the present invention.

FIG. 4 depicts a flow chart of a method 400 for automated feature toggle with annotations, in accordance with embodiments of the present invention. The method includes a first step 402 by one or more processors of a computer system, such as the computer system 120. The method 400 then includes a step 404 of tracking, by the one or more processors of the computer system, check-in or pull requests on the source code during code merges that are associated with a task in a development lifecycle tool, and a step 406 of invoking, by the one or more processors of the computer system, the automated annotation system to automatically add annotations to the features when the source code is merged with a code merge. During the step 406, the automated annotation system may identify a feature name from a task associated with the code merge. The method 400 include a next step 408 of annotating features of the received source code using an automated annotation system such as the code automation module 132, by the one or more processors of the computer system, for example to provide annotations for the features in the source code. Step 408 may be performable by, for example, the code annotation module 132. The method 400 includes another step 410 of relating, by the one or more processors of a computer system and/or the code annotation module thereof, a code execution path of the source code to the features during the annotating. Still further, the method 400 includes a step 412 of deploying the source code along with the annotations into an application using a continuous integration/continuous delivery pipeline (CI/CD). The method 400 includes a further step 414 of allowing, by the one or more processors of the computer system, the CI/CD pipeline to deploy a code analytics engine in a sidecar pattern along with the source code, such as the code analytic engine module 133. The method 400 includes a step 416 of identifying, by the one or more processors of the computer system, a runtime issue associated with the source code and a step 418 of identifying, by the one or more processors of the computer system using a code analytic engine, one or more of the features based on the annotations that are associated with the runtime issue. Finally, the method 400 includes a step 420 of automatically disabling, by the one or more processors of the computer system (e.g. by interacting with the feature toggle system 110), the identified one or more features associated with the runtime issue.

Figure 5:
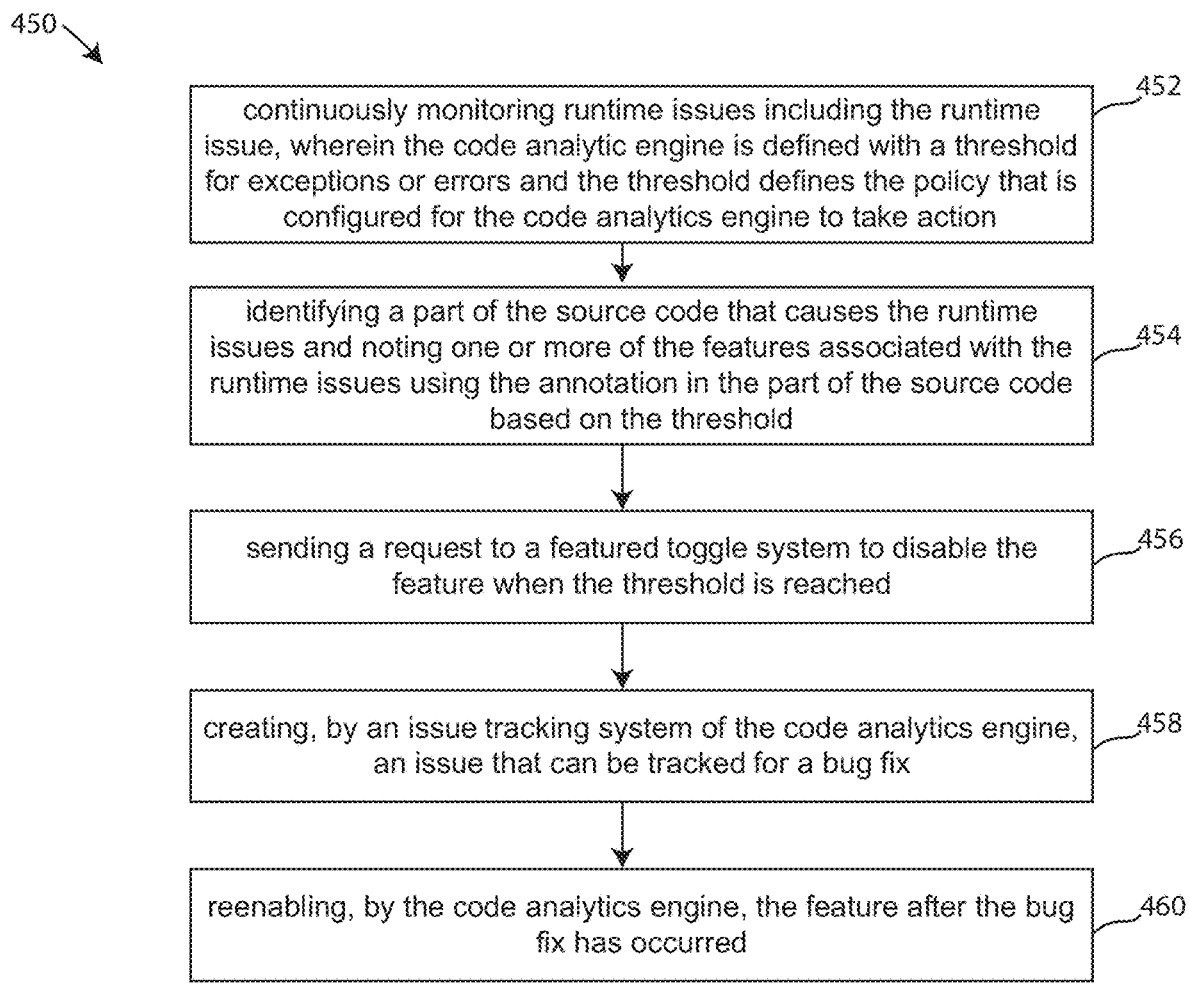
FIG. 5 depicts a flow chart of another method for automated feature toggle with annotations, in accordance with embodiments of the present invention.

FIG. 5 depicts a flow chart of another method 450 for automated feature toggle with annotations, in accordance with embodiments of the present invention. The method 450 includes a first step 452 of continuously monitoring, by a code analytic engine such as the code analytic engine module 133, runtime issues including the runtime issue.

During this step 452, the code analytic engine is defined with a threshold for exceptions or errors and the threshold defines the policy that is configured for the code analytics engine to take action. The method 450 includes another step 454 of identifying, by the code analytic engine, a part of the source code that causes the runtime issues and noting one or more of the features associated with the runtime issues using the annotations in the part of the source code based on the threshold. The method 450 includes a still further step 456 of sending, by the code analytic engine, a request to a feature toggle system to disable the feature when the threshold is reached, and another step 458 of creating, by an issue tracking system of the code analytics engine, an issue that can be tracked for a bug fix. Finally, the method 450 includes a step 460 of reenabling, by the code analytics engine, the feature after the bug fix has occurred.

Figure 6:
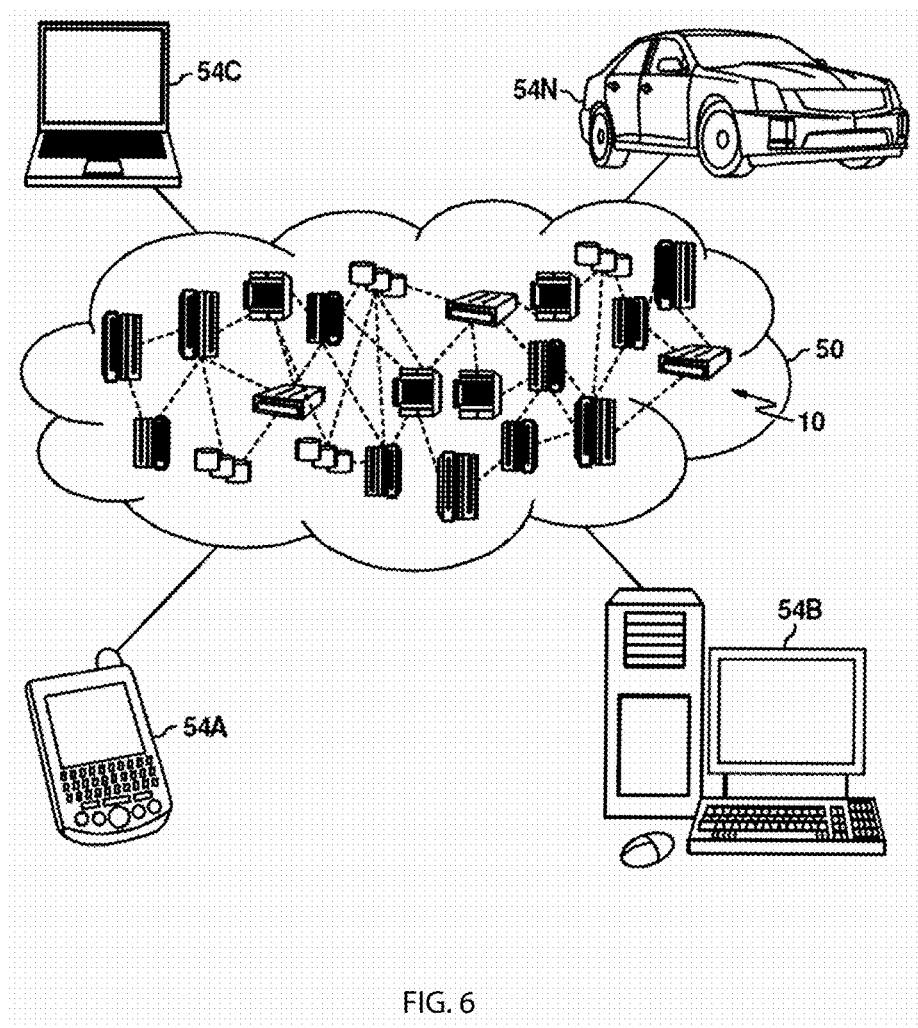
FIG. 6 depicts a block diagram of a computer system for the system and engine of FIGS. 1-2, capable of implementing methods such as those of FIGS. 3-5, in accordance with embodiments of the present invention.

FIG. 6 illustrates a block diagram of a computer system that may representative of any computer or computer system within the system for automated feature toggle with annotations of FIGS. 1-2, capable of implementing methods for automated feature toggle with annotations of FIGS. 3-5, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for automated feature toggle with annotations, in the manner prescribed by the embodiments of FIGS. 3-5 using the system for automated feature toggle with annotations of FIGS. 1-2, wherein the instructions of the computer code 597 may be executed by processor 591 via memory device 595. The computer code 597 may include software or program instructions that may implement one or more algorithms for implementing the methods of automated feature toggle with annotations, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 6.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to systems and methods for automated feature toggle with annotations. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to provide a system for automated feature toggle with annotations. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for automated feature toggle with annotations. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for automated feature toggle with annotations.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
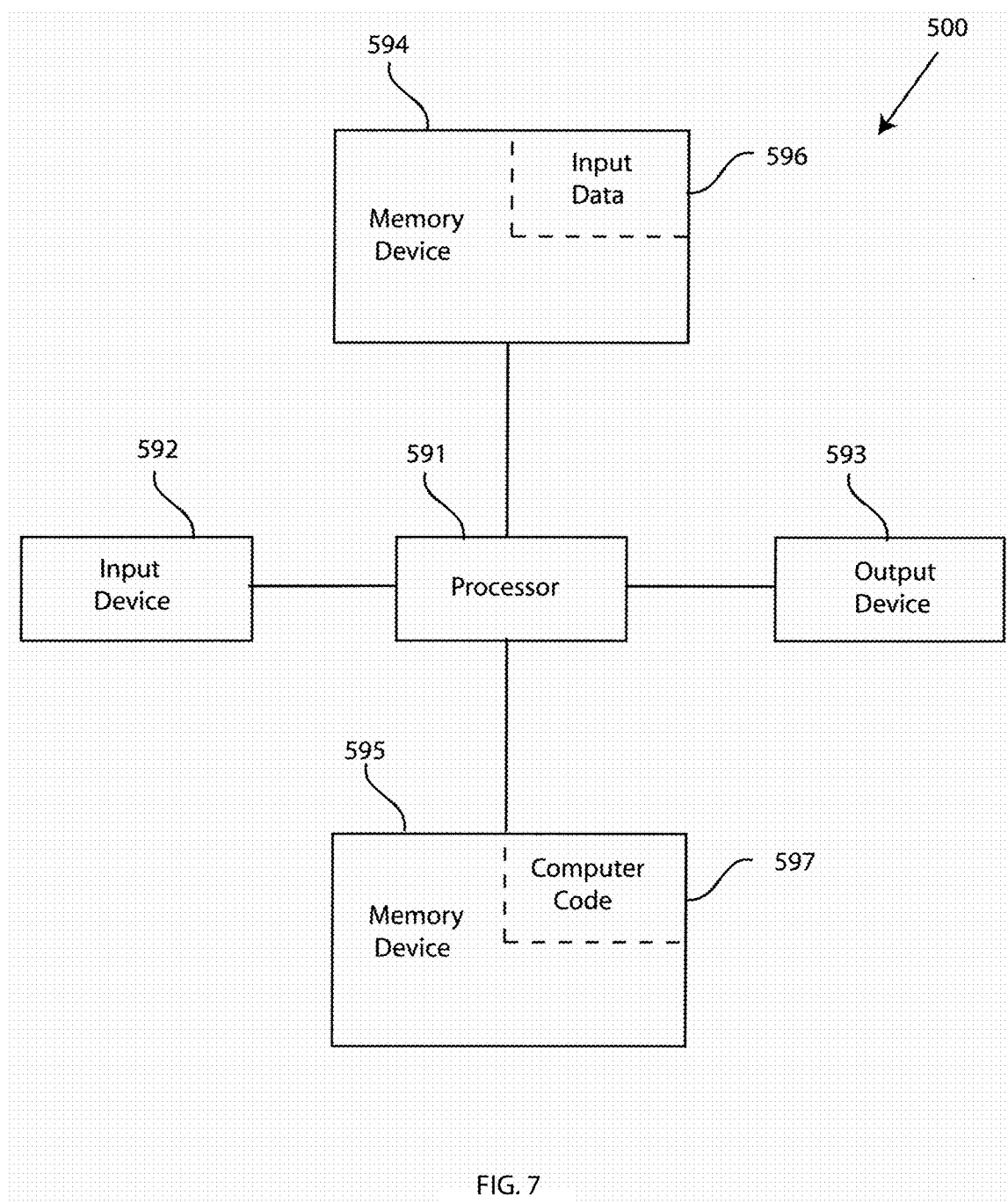
FIG. 7 depicts a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
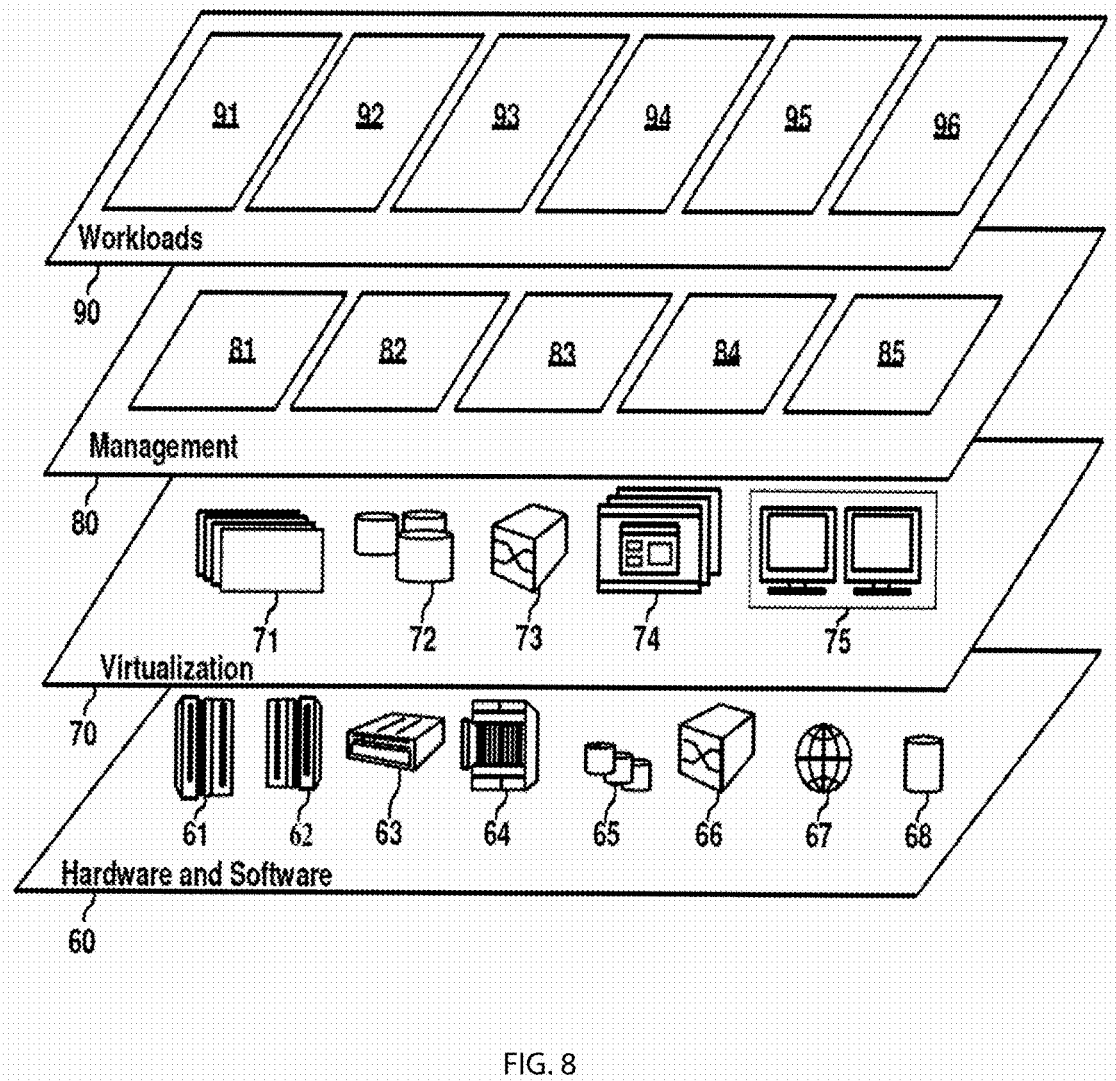
FIG. 8 depicts abstraction model layers, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: sending and receiving 91; feature toggling 92; Source code management 93; issue tracking 94; code annotating 95; and code analytics 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving, by one or more processors of a computer system, source code;
annotating, by the one or more processors of the computer system, features of the received source code using an automated annotation system to provide annotations for the features;
relating, by the one or more processors of the computer system, a code execution path of the source code to the features during the annotating;
defining, by the one or more processors of the computer system, a policy with a threshold for runtime errors or exceptions that causes a code analytics engine of the computer system to take a disabling action on one or more features of a deployed application, wherein the one or more features are associated with the runtime errors or exceptions;
continuously monitoring, by the code analytics engine of the computer system, the deployed application for the runtime errors or exceptions;
identifying, by the one or more processors of the computer system, a runtime issue associated with the source code when the threshold for the runtime errors or exceptions has been reached;
identifying, by the one or more processors of the computer system using the code analytics engine, the one or more of the features associated with the runtime errors or exceptions, and noting the one or more features based on one or more annotation of the annotations that are associated with the runtime errors or exceptions;
automatically disabling, by the one or more processors of the computer system, the identified one or more of the features associated with the runtime errors or exceptions;
providing, by the one or more processors of the computer system, an issue notification to a developer platform associated with the automatically disabling and including the one or more annotation of the annotations;
sending, by the code analytics engine, a request to a feature toggle system to disable the feature when the threshold is reached;
creating, by an issue tracking system of the code analytics engine, an issue that can be tracked for a bug fix; and
reenabling, by the code analytics engine, the feature after the bug fix has occurred.

2. The method of claim 1, further comprising:
tracking, by the one or more processors of the computer system, check-in or pull requests on the source code during code merges that are associated with a task in a development lifecycle tool.

3. The method of claim 1, further comprising:
invoking, by the one or more processors of the computer system, the automated annotation system to automatically add annotations to the features when the source code is merged with a code merge, wherein the automated annotation system identifies a feature name from a task associated with the code merge.

4. The method of claim 1, further comprising:
deploying, by the one or more processors of the computer system, the source code along with the annotations into an application using a continuous integration/continuous delivery (CI/CD) pipeline; and
allowing, by the one or more processors of the computer system, the CI/CD pipeline to deploy the code analytics engine in a sidecar pattern along with the source code.

5. The method of claim 1, further comprising:
continuously monitoring, by the code analytics engine, runtime issues including the runtime issue, wherein the threshold defines the policy that is configured for the code analytics engine to take action.

6. The method of claim 5, further comprising:
identifying, by the code analytics engine, a part of the source code that causes the runtime issues and noting one or more of the features associated with the runtime issues using the annotations in the part of the source code based on the threshold.

7. A computer system, comprising:
one or more processors;
one or more memory devices coupled to the one or more processors; and
one or more computer readable storage devices coupled to the one or more processors, wherein the one or more storage devices contain program code executable by the one or more processors via the one or more memory devices to implement a method for incident management in a data warehouse, the method comprising:
receiving, by the one or more processors of the computer system, source code;
annotating, by the one or more processors of the computer system, features of the received source code using an automated annotation system to provide annotations for the features;
relating, by the one or more processors of the computer system, a code execution path of the source code to the features during the annotating;
defining, by the one or more processors of the computer system, a policy with a threshold for runtime errors or exceptions that causes a code analytics engine of the computer system to take a disabling action on one or more features of a deployed application, wherein the one or more features are associated with the runtime errors or exceptions;
continuously monitoring, by the code analytics engine of the computer system, the deployed application for the runtime errors or exceptions;
identifying, by the one or more processors of the computer system, a runtime issue associated with the source code when the threshold for the runtime errors or exceptions has been reached;
identifying, by the one or more processors of the computer system using the code analytics engine, the one or more of the features associated with the runtime errors or exceptions, and noting the one or more features based on one or more annotation of the annotations that are associated with the runtime errors or exceptions;
automatically disabling, by the one or more processors of the computer system, the identified one or more of the features associated with the runtime errors or exceptions;
providing, by the one or more processors of the computer system, an issue notification to a developer platform associated with the automatically disabling and including the one or more annotation of the annotations;
sending, by the code analytics engine, a request to a feature toggle system to disable the feature when the threshold is reached;
creating, by an issue tracking system of the code analytics engine, an issue that can be tracked for a bug fix; and
reenabling, by the code analytics engine, the feature after the bug fix has occurred.

8. The computer system of claim 7, the method further comprising:
tracking, by the one or more processors of the computer system, check-in or pull requests on the source code during code merges that are associated with a task in a development lifecycle tool.

9. The computer system of claim 7, the method further comprising:
invoking, by the one or more processors of the computer system, the automated annotation system to automatically add annotations to the features when the source code is merged with a code merge, wherein the automated annotation system identifies a feature name from a task associated with the code merge.

10. The computer system of claim 7, the method further comprising:
deploying, by the one or more processors of the computer system, the source code along with the annotations into an application using a continuous integration/continuous delivery (CI/CD) pipeline; and
allowing, by the one or more processors of the computer system, the CI/CD pipeline to deploy the code analytics engine in a sidecar pattern along with the source code.

11. The computer system of claim 7, the method further comprising:
continuously monitoring, by the code analytics engine, runtime issues including the runtime issue, wherein the threshold defines the policy that is configured for the code analytics engine to take action.

12. The computer system of claim 11, the method further comprising:
identifying, by the code analytics engine, a part of the source code that causes the runtime issues and noting one or more of the features associated with the runtime issues using the annotations in the part of the source code based on the threshold.

13. A computer program product for incident management of a data warehouse, the computer program product comprising:
one or more computer readable storage media having computer readable program code collectively stored on the one or more computer readable storage media, the computer readable program code being executed by one or more processors of a computer system to cause the computer system to perform a method comprising:
receiving, by one or more processors of a computer system, source code;
annotating, by the one or more processors of the computer system, features of the received source code using an automated annotation system to provide annotations for the features;
relating, by the one or more processors of the computer system, a code execution path of the source code to the features during the annotating;
defining, by the one or more processors of the computer system, a policy with a threshold for runtime errors or exceptions that causes a code analytics engine of the computer system to take a disabling action on one or more features of a deployed application, wherein the one or more features are associated with the runtime errors or exceptions;
continuously monitoring, by a code analytics engine of the computer system, the deployed application for the runtime errors or exceptions;
identifying, by the one or more processors of the computer system, a runtime issue associated with the source code when the threshold for the runtime errors or exceptions has been reached;

identifying, by the one or more processors of the computer system using the code analytics engine, the one or more of the features associated with the runtime errors or exceptions, and noting the one or more features based on one or more annotation of the annotations that are associated with the runtime errors or exceptions;

automatically disabling, by the one or more processors of the computer system, the identified one or more of the features associated with the runtime errors or exceptions; and providing, by the one or more processors of the computer system, an issue notification to a developer platform associated with the automatically disabling and including the one or more annotation of the annotations;

sending, by the code analytics engine, a request to a feature toggle system to disable the feature when the threshold is reached;

creating, by an issue tracking system of the code analytics engine, an issue that can be tracked for a bug fix; and reenabling, by the code analytics engine, the feature after the bug fix has occurred.

14. The computer program product of claim 13, the method further comprising:

invoking, by the one or more processors of the computer system, the automated annotation system to automatically add annotations to the features when the source code is merged with a code merge, wherein the automated annotation system identifies a feature name from a task associated with the code merge.

15. The computer program product of claim 13, the method further comprising:

deploying, by the one or more processors of the computer system, the source code along with the annotations into an application using a continuous integration/continuous delivery (CI/CD) pipeline; and allowing, by the one or more processors of the computer system, the CI/CD pipeline to deploy the code analytics engine in a sidecar pattern along with the source code.

16. The computer program product of claim 13, the method further comprising:

continuously monitoring, by the code analytics engine, runtime issues including the runtime issue, wherein the threshold defines the policy that is configured for the code analytics engine to take action.

17. The computer program product of claim 16, the method further comprising:

identifying, by the code analytics engine, a part of the source code that causes the runtime issues and noting one or more of the features associated with the runtime issues using the annotations in the part of the source code based on the threshold.

* * * * *